United States Patent [19]
Lanser

[11] 3,874,681
[45] Apr. 1, 1975

[54] INTERNAL PIPE CLAMP

[76] Inventor: Robert Lanser, Rt. 1 Box 203, Iron, Minn. 55751

[22] Filed: May 24, 1973

[21] Appl. No.: 363,508

[52] U.S. Cl............................................. 279/2 R
[51] Int. Cl.......................................... B23b 31/40
[58] Field of Search............ 279/2; 82/44; 269/48.1; 242/72

[56] References Cited
UNITED STATES PATENTS

| | | | |
|---|---|---|---|
| 163,217 | 5/1875 | Lawson | 279/2 |
| 1,518,026 | 12/1924 | Van Sluys | 242/72 |
| 2,390,168 | 12/1945 | Piot | 242/72 |

Primary Examiner—Gil Weidenfeld
Attorney, Agent, or Firm—Wicks & Nemer,

[57] ABSTRACT

An Internal Pipe Clamp for spinning a pipe for cutting including a shaft, an annular compressible member mounted on said shaft against rotation, the compressible member positioned against a fixed plate on the end of the shaft and a pressure plate movable axially on the shaft against the compressible member together with a nut mounted on a threaded portion of the shaft for drawing up the pressure plate upon the compressible member to compress the same and increase the diameter thereof.

4 Claims, 4 Drawing Figures

INTERNAL PIPE CLAMP

SUMMARY

The invention relates to an internal pipe clamp, and it is an object of the invention to provide a plug type member expandable within the pipe to thereby grip the internal surface of the same and allow driving rotation of the pipe. It is also an object of the invention to provide an internal pipe clamp having a simple draw-up means for expanding the compressible member radially by rotating a draw-up nut on a shaft against a pressure plate mounted adjacent the compressible member which abuts a fixed plate.

In the drawings forming a part of this application:

Figure 1:
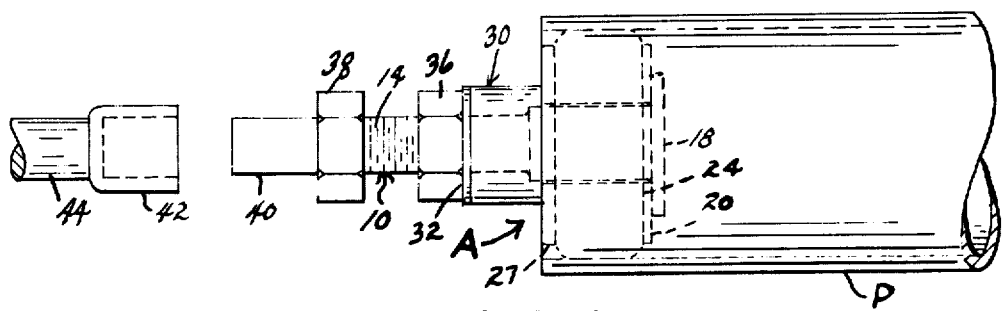
FIG. 1 is a side elevational view of a plug tool for spinning a pipe for the cutting of the pipe.
Figure 2:
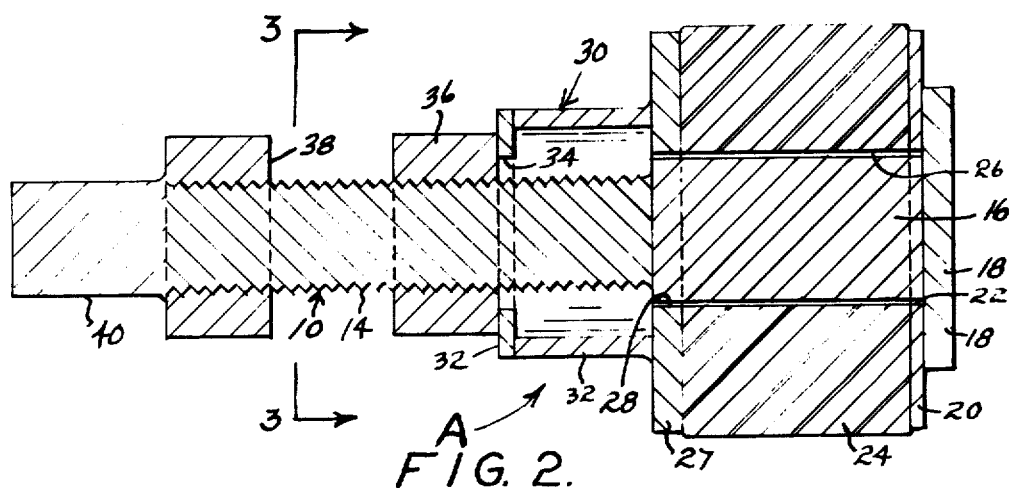
FIG. 2 is a longitudinal sectional sectional view of the tool.
Figure 3:
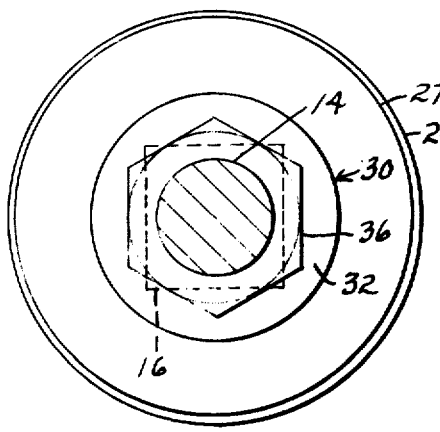
FIG. 3 is an inner end view of the tool on the line 3—3 of the tool on the line 3—3 of FIG. 2.
Figure 4:
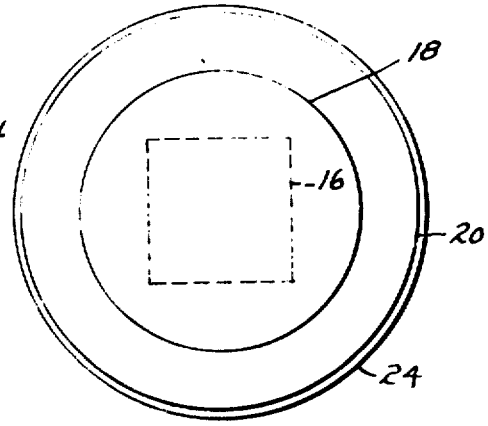
FIG. 4 is an outer end view thereof.

Referring to the drawings in detail, the tool A includes the shaft 10 formed with the threaded portion 14. The threaded portion 14 terminates in the outer end portion 16 which is square in cross-section. Secured to the outer end of the portion 16 is the outer stop plate 18.

The numeral 20 designates a circular base plate which is formed with the square opening 22 whereby the plate 20 fits upon the end portion 16 and against the stop plate 18. Further provided is the compressible and expandable plug member 24 the outer edge of which is circular and the same is formed with the axial hole 26 therein. The member 24 may be made of rubber or similar material. The axial hole 26 receives the squared portion 16. Additionally provided is the circular pressure plate 27 which is also formed with a square hold 28 whereby the plate fits on the squared end portion 16. Secured to the plate 26 is the cap member 30 which is formed of the annular wall 32 secured at the outer edge to the plate 27 and axially of the hole 28. A further circular plate 32 is secured to the outer end of the wall 32 and is formed with the axial opening 34 of a diameter to allow the threaded portion 14 of the shaft 10 extend therethrough.

Mounted on the threaded portion 14 of the shaft 10 is the nut 36, and threadedly mounted on the outer end of the portion 14 is the nut 38 which has secured thereto the squared end portion 40.

The tool A is used in the following manner: The plug member 24 together with the plates 20 and 27 are extended into the end of a pipe.

The nut 36 is then advanced on the threaded shaft portion 14 of the shaft 10 against the cap member 30 carrying the plate 27. The plate 27 is forced against the rubber plug 24 which in turn is forced against the base plate 20 thereby expanding the diameter of the plug for gripping the inner-surface of the pipe. When this is done the pipe so engaged by the device may be rotated by securing the squared end 40 of the connector 42 on the shaft 44, the shaft being rotated by any conventional source of power. As the pipe P is rotated it may be cut by conventional cutting tools.

I claim:
1. An internal pipe clamp comprising:
   a. a shaft having threads along one portion thereof and having a second portion adjacent thereto,
   b. a stop plate secured to the free end of said second portion of said shaft,
   c. an annular compressible member increasing in diameter under compression being received on said second portion of said shaft and one end thereof abutting said stop plate,
   d. means supporting said compressible member on said second portion of said shaft against rotation thereon,
   e. a pressure member positioned on said shaft adjacent the other end of said compressible member and being axially movable on said shaft into engagement with the compressible member,
   f. means threadingly supported on the threaded portion of said shaft and movable therealong to urge said pressure member against said compressible member to increase the diameter thereof,
   g. the diameter of said compressible member, at least in the compressed condition, extending radially beyond said pressure member and said stop plate, whereby said second portion of said shaft can be received in the end of a pipe and the last mentioned means threaded along said shaft to expand the compressible member into frictional engagement with the pipe.

2. The device of claim 1 in which said means mounting said annular member on said shaft against rotation includes
   a. said shaft having a non-circular cross section with
   b. an axial hole extended through said compressible member and having a cross section the same as that of said shaft.

3. The device of claim 2 in which said pressure member includes a plate having a non-circular hole mounted axially on the non-circular portion of said shaft.

4. The device of claim 1 in which said pressure member includes a plate having a non-circular hole mounted axially on the non-circular portion of said shaft.

* * * * *